May 18, 1954  E. C. UHLIG ET AL  2,678,961
BATTERY SEPARATOR AND METHOD OF MAKING SAME
Filed Dec. 23, 1952  2 Sheets-Sheet 1
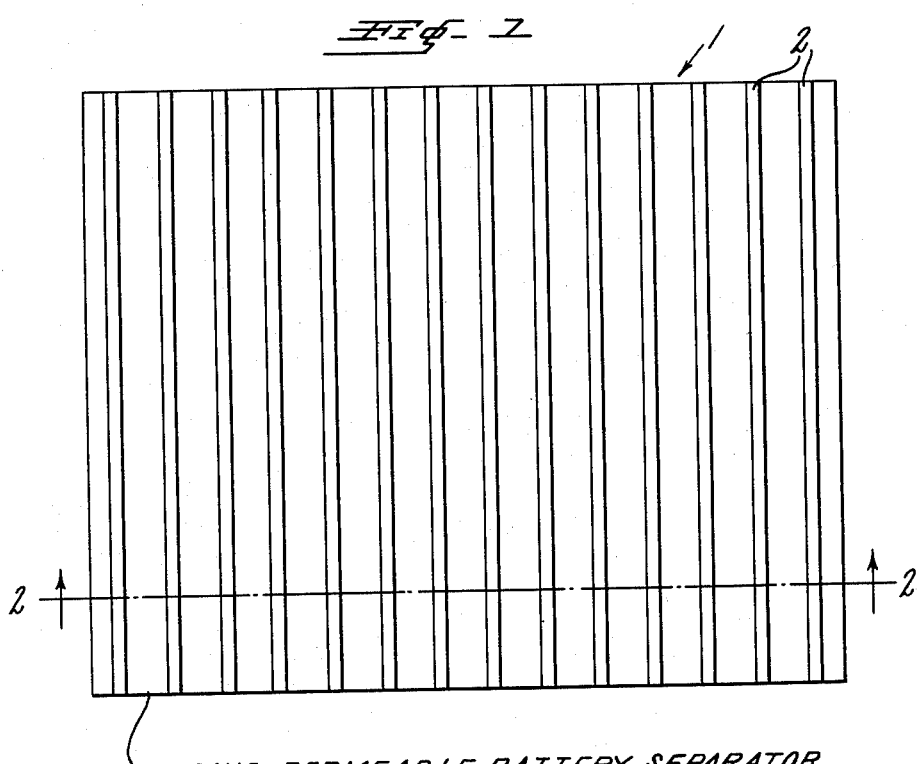
LIQUID PERMEABLE BATTERY SEPARATOR OF CELLULOSIC FIBROUS SHEET IMPREGNATED WITH MIXTURE OF C-STAGE PHENOL-FORMALDEHYDE RESIN AND GASOLINE-INSOLUBLE PINE WOOD RESIN OF TYPE KNOWN AS "VINSOL"
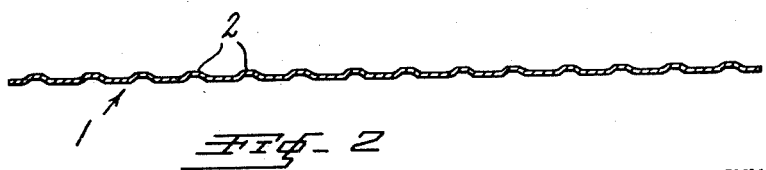
INVENTORS
EDWIN C. UHLIG
ARMANDO DE FUSCO
BY
Robert J. Patterson
ATTORNEY

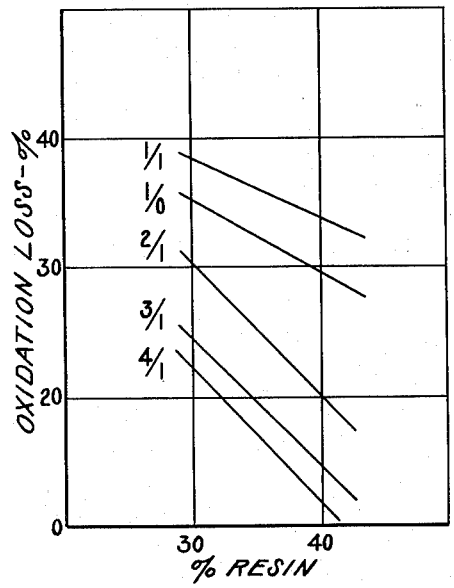
Fig. 3 — OXIDATION VS. % RESIN
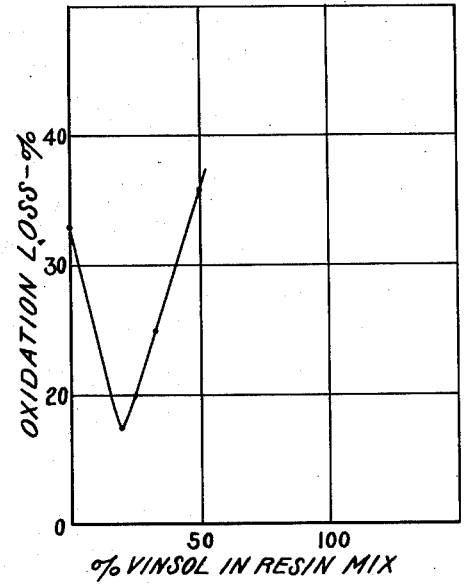
Fig. 4 — OXIDATION VS. % VINSOL
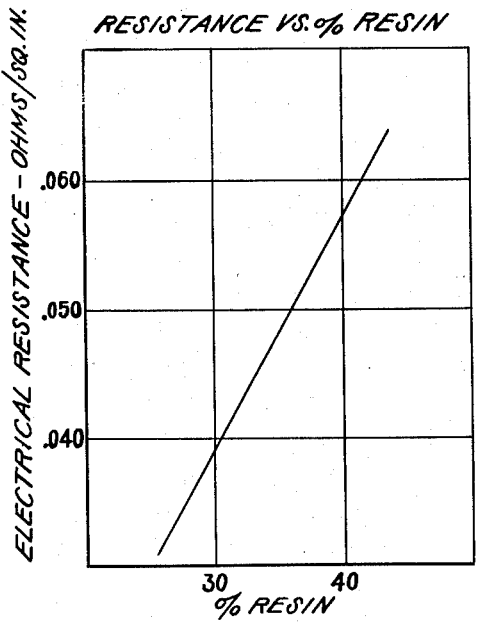
Fig. 5 — RESISTANCE VS. % RESIN
INVENTORS
EDWIN C. UHLIG
ARMANDO DE FUSCO
BY
ATTORNEY Patented May 18, 1954

2,678,961

UNITED STATES PATENT OFFICE 2,678,961

BATTERY SEPARATOR AND METHOD OF MAKING SAME

Edwin C. Uhlig, Greenwood, and Armando De Fusco, Providence, R. I., assignors to United States Rubber Company, New York, N. Y., a corporation of New Jersey Application December 23, 1952, Serial No. 327,474

7 Claims. (Cl. 136—146)

This invention is an improvement in the art of liquid permeable phenol-formaldehyde resin-impregnated cellulosic fiber sheet battery separators, such as those described in copending applications of Uhlig et al., Serial Nos. 240,312 (now Patent No. 2,662,106); 240,313 (now Patent No. 2,662,107); 240,314 and 240,315 (now Patent No. 2,662,032), all filed August 4, 1951. More particularly the invention relates to such battery separators in which the cellulose fiber is protected against battery acid with a mixture of a phenol-formaldehyde resin and a substantially gasoline-insoluble pine wood resin of the type known as "Vinsol" resin.

In the accompanying drawings:

Fig. 1 is a plan view of a separator of our invention.

Fig. 2 is a sectional view on the line 2—2 of Fig. 1.

Fig. 3 is a graph showing how the oxidation loss varies with the percent of total resin for various ratios of phenolic resin to "Vinsol" in the resin mixture with which the cellulosic sheet is impregnated. The ratios of phenolic resin to "Vinsol" are 1/1, 1/0, 2/1, 3/1, and 4/1 as indicated.

Fig. 4 is a curve showing how the oxidation loss varies with the percent "Vinsol" in the resin at a total resin content (phenolic plus "Vinsol") of 35% based on the total dry fiber plus dry resin.

Fig. 5 is a graph showing how the electrical resistance varies with the percent of total resin in the dry separator.

A major portion of the lead type electric storage battery use insulators or separators which have been manufactured from wood. Wooden separators are used because they are inexpensive relative to separators made heretofore from other materials suitable as a battery plate insulator, such as glass fiber separators, microporous hard rubber separators, etc. However, a serious disadvantage of the wooden separator is that before it can be used in a battery it must be conditioned wet and then continuously maintained in the wet condition until finally submerged in the electrolyte of the storage battery in which it is used.

The wooden separator also cannot be used in the dry-charge type of storage battery since it must be maintained in the wet condition. Although microporous hard rubber separators are suitable for dry-charge storage batteries and also have many processing and performance advantages over the wooden separator, they are too expensive to compete for the market serviced by the wooden separator.

The present invention contemplates an inexpensive separator formed from a bibulous cellulosic fibrous sheet, such as one made from wood pulp or cotton linters, impregnated with a resin mixture comprising a thermosetting phenol-formaldehyde resin and a substantially gasoline-insoluble pine wood resin, the said resin mixture when cured being capable of protecting the cellulose fibers from the action of the battery electrolyte and also serving to increase the strength of the separator, helping to hold the fibers in place and imparting to the separator sufficient stiffness to cause it to retain the desired rib formation after the sheet has been embossed.

The battery separator contemplated by the present invention can be manufactured at sufficiently low cost to compete in price with the above-mentioned wooden battery separator, and it also possesses an important advantage over the wooden separator in that it does not need to be kept wet prior to its introduction into a battery and immersion in the electrolyte of the battery.

Battery separators have been prepared from a bibulous cellulose fibrous sheet which has been impregnated with an A-stage phenol-formaldehyde resin in an aqueous medium such as water or aqueous acetone or aqueous lower aliphatic alcohol containing not more than three carbon atoms per molecule, e. g. methanol, ethanol, or isopropanol and then heated to convert the resin to the C-stage. Such battery separators have been described in the above-mentioned Uhlig et al. applications.

In order to make a successful battery separator, the fibrous sheet must be impregnated with a sufficient amount of resin to strengthen the sheet and to protect the fibers from the battery acid. At the same time, however, the battery separator must be sufficiently porous to permit the electrolyte to pass freely through the interstices of the fibrous sheet. Therefore, the amount of resin that may be employed to protect the fibers against battery acid is limited in great part by the electrical resistance desired in the finished separator.

The present invention provides a means of improving the protective properties of the impregnating resin so that adequate protection of the fibers against the chemical action of the battery acids and the oxidative conditions encountered in the operation of lead type storage batteries can be obtained at lower resin levels.

The present invention is based upon our discovery that by using a substantially gasoline-insoluble pine wood resin of the type known in the trade and in the art as "Vinsol" in conjunction with and in intimate admixture with an A-stage phenol-formaldehyde resin of the type heretofore employed for making resin-impregnated bibulous cellulosic fibrous sheet battery separators, it is possible and commercially feasible to substantially and importantly reduce the total weight of resin introduced into the separator sheets for a given level of chemical resistance, thereby making it possible to make a separator having lower electrical resistance at the same level of chemical resistance. Alternatively, our invention can be employed to produce a separator product which is significantly superior with respect to resistance against chemical attack at the same level of electrical resistance which is obtained with the phenol-formaldehyde resin alone.

In the practice of our invention we thoroughly impregnate the bibulous cellulosic fibrous sheet having an alpha cellulose content of at least 85% and an apparent density of 3.0 to 8.0 grams/cu. in. with an intimate mixture of an A-stage phenol-formaldehyde resin and the substantially gasoline-insoluble pine wood resin. We much prefer to form this mixture of resins in situ by impregnating the fibrous sheet with an aqueous mixture of the A-stage phenol-formaldehyde resin and a dispersion of the pine wood resin, drying, embossing, and then curing the impregnated sheet to convert or advance the A-stage phenol-formaldehyde resin to the C-stage. The resulting resin mixture protects the fibers against attack by the battery acid but does not substantially reduce the air permeability of the cellulosic sheet. Typically, the amount of the C-stage phenol-formaldehyde resin and the pine wood resin employed in the practice of our invention ranges from 25 to 50% by weight based on the combined weight (dry) of fibers and resins.

Our use of the pine wood resin in conjunction with the phenol-formaldehyde resin makes it readily possible to effect a 5 to 10% decrease in the net weight of resin introduced into the cellulosic sheet.

In the preferred practice of our invention, we form an aqueous dispersion of the pine wood resin in any suitable manner and we then commingle this dispersion with a solution of an A-stage phenol-formaldehyde resin in an aqueous medium such as water or aqueous $C_1$ to $C_3$ alkanol or acetone. We usually employ such relative proportions of the phenol-formaldehyde resin solution and the pine wood resin dispersion that the amount of pine wood resin ranges from 5 to 50% by weight based on the sum of the phenol-formaldehyde resin and the pine wood resin (on a dry basis). Preferably the proportion of the pine wood resin ranges from 20 to 35% by weight of the sum of the phenol-formaldehyde resin and the pine wood resin.

To illustrate the improvement made possible by our invention the following may be considered. A typical finished battery separator formed from a suitable bibulous cellulosic fibrous sheet which has been impregnated with a predetermined amount of an A-stage phenol-formaldehyde resin in an aqueous medium and then heated to convert the resin to the C-stage will have an electrical resistance in 1.250 specific gravity sulfuric acid of 0.040–0.050 ohm per square inch when sprayed with wetting agent to permit the sheet to absorb electrolyte quickly and will show a loss in weight of 40 to 55% upon continuous immersion for 2 hours in a boiling mixture of an oxidizing acid solution consisting of 43.3 parts of 95% sulfuric acid, 10 parts of potassium dichromate and 985 parts of distilled water. The acid boil test is performed at a ratio of dry cured separator material to oxidizing acid of 1.50 grams of separator material to 800 cc. of oxidizing acid solution. Also, to insure instant wetting by the acid oxidizing solution the separator material is pretreated with a solution of 9.2 parts of 95% sulfuric acid, 1 part of wetting agent, "Tergitol 08" (sodium salt of 2-ethyl hexyl sulfate), and 200 parts of distilled water under 25 inches of mercury vacuum for 1 hour.

In contrast, when the same cellulosic fibrous sheet is impregnated to the same resin content using a mixture of the same A-stage phenol-formaldehyde resin in the aqueous medium with an aqueous dispersion of "Vinsol" resin, in such proportions as to give a weight ratio of phenolic resin to "Vinsol" of 3:1, and then cured and sprayed with wetting agent, the electrical resistance of the resulting separator is substantially the same but the loss in weight of the latter separator when exposed to the 2-hour oxidation test is only 20–35%. Obviously the separator showing the lower loss in this oxidation test would show much longer battery life before failure in service.

"Vinsol" resin is a substantially gasoline-insoluble resinous material which may be prepared from pine wood by the processes set forth in U. S. patents to Hall 2,193,026 and 2,221,540. This fraction is characterized by being substantially completely insoluble in petroleum hydrocarbons such as gasoline, the gasoline-soluble portion of this fraction generally not exceeding 15% by weight. This fraction may be said to be the gasoline-insoluble resin contained in pine wood. For example, the extraction of pine wood with benzene yields a mixture of this fraction and an impure rosin. Upon commingling the molten resinous mixture with a mixture of gasoline and a relatively small volume of furfural, the fraction in question goes into solution in the furfural while the impure rosin goes into solution in the gasoline. The two layers are then allowed to separate and the resinous materials may then be recovered from the respective layers. Other methods of isolating the desired petroleum hydrocarbon-insoluble pine wood resin can be employed, if desired. This resin has a dark red brown color, is cherry red in solution, and will vary somewhat in its specific characteristics such as acid number, melting point, exact gasoline or petroleum ether solubility, and content of naphtha and aromatic hydrocarbon-soluble material, depending upon the details of the extraction processes utilized.

"Vinsol" resin is a complex mixture of many uncharacterized components including complex phenols, phenol ethers, and polyphenols. It is partly soluble in aromatic hydrocarbons and completely soluble in alcohol and acetone. In general it is characterized by a methoxy content of from 3 to 7.5%, an acid number of from 90 to 110, a melting point (drop method) of from 95° C. to 125° C., petroleum ether insolubility of 85% or more and a saponification number of from 135 to 160.

Although the basic materials used in making battery separators in accordance with our invention can be varied in amounts and composition, we prefer to manufacture a battery separator having the basic composition of 67% by weight of bibulous fibrous cellulosic material (predominantly alpha cellulose) and 33% by weight of a thermosetting phenol-formaldehyde resin modified with "Vinsol" resin in the ratio of A-stage phenol-formaldehyde resin to "Vinsol" resin of 3:1 to 2:1, all percentages and ratios being on a dry material basis.

The nature of the fibrous sheet used in carrying out the present invention is important if good battery separators are to be produced. We prefer a bibulous cellulosic fibrous sheet which contains at least 85% alpha cellulose. Such a sheet is obtained by using purified cotton linters or wood pulp which has been freed of most of the natural resins by methods well known to those skilled in the art. This fibrous sheet should be uniform as to thickness and as to fiber distribution. The thickness of the original fibrous sheet can range from 0.005" to 0.100"; particularly from 0.020" to 0.040", a thickness of about 0.030" being most useful. The sheet should be porous, readily wettable by water, and have an apparent density of 3 to 8 grams /cu. in. so that the resins with which the sheet is impregnated can penetrate deeply into the sheet to coat and unite the fibers.

The sheet employed should exhibit what is known as uniform "formation," i. e., it should have uniformity of fiber distribution and homogeneity of structure. This is very important since a sheet may be satisfactory in all other respects but if it is deficient in "formation" it will not give a satisfactory battery separator in the practice of our invention because the non-uniform fiber distribution will result in non-uniform resin distribution.

We can use any A-stage phenol-formaldehyde resin which is dispersible in water or in a solvent composed of 10 to 50% by weight of water and correspondingly 90 to 50% by weight of a $C_1$ to $C_3$ alkanol or of acetone to give a solution containing from 13 to 50% by weight of the resin, and which possesses adequate resistance to battery acid when cured to the C-stage. Those skilled in the phenol-formaldehyde resin art can readily prepare such a resin. Many such resins are well-known in the art, examples being those sold as "Durez 16056," "Resinox 468" and "Bakelite BR 18583." Although ordinary phenol is usually used in making the resin, it can be replaced with its homologs such as the cresols and xylenols.

The impregnation of the cellulosic sheet is typically accomplished by first saturating it thoroughly by simply passing it through a bath of the aqueous mixture of the phenol-formaldehyde resin and dispersion of the "Vinsol" resin, followed by passage through ordinary squeeze rolls to remove excess solution and leave in the sheet an amount of mixture ranging from 120 to 250% based on dry fiber sheet, which amount is sufficient, upon drying to remove volatiles, and curing of the phenolic resin, to leave cured phenolic resin and "Vinsol" resin in the cured sheet in an amount of from 25 to 50% by weight, the latter percentages being based on the weight of the dry resin plus fiber. Because of the highly absorbent nature of the sheet, it will absorb a quantity of the solution in excess of that required so that squeezing to remove the excess is required.

Care should be taken in the squeezing step to limit the squeezing pressure so as to not injure the physical properties of the fibrous web.

We prefer that the amount of phenolic resin plus "Vinsol" resin applied range from 25 to 50% by weight based on fibers plus resins. At values below 25% the life of the separator begins to be short while at values above 50% the electrical resistance of the separator begins to be high.

We next dry the impregnated sheet to substantially remove the volatiles which typically comprise water, alcohol or acetone if such be used in conjunction with the water, and other volatiles, including any ammonia and including some excess formaldehyde and free phenol. The conditions of drying are not particularly critical so long as drying is so carried out that the phenolic resin is not materially advanced.

We prefer to so limit the drying of the impregnated sheet that the dried sheet contains from 5 to 30% (based on net dry sheet of fiber plus resin) of volatile and more preferably from 10 to 20% thereof.

The sheet which has been dried to the above content of volatiles does not appear wet but at the higher levels in the stated ranges may be damp to the touch.

We next subject the dried sheet to embossing to deform it along spaced lines forming integral protuberances on one side of the sheet with corresponding depressions on the other side. This can be done by passing the sheet continuously through spaced co-operating, i. e. suitably meshed, male and female embossing rolls, one roll having upstanding ribs and the other having corresponding grooves. We can also emboss batchwise using a closed flat plate male and female embossing die. We prefer that the embossing rolls or die rolls not be supplied with heat. However, we can use heated embossing equipment, carrying out a substantial portion or all of the curing of the phenolic resin to the C-stage therein.

We next pass the embossed sheet to a curing chamber in which it is heated at a temperature and for a time such as to completely advance the phenolic resin to the C-stage.

Curing serves to permanently set the web and the ribs embossed therein.

The hot cured embossed web leaving the curing chamber is then contacted, as by immersion or by spraying, with an aqueous solution of a wetting agent of any suitable type which will facilitate wetting of the finished separator by the battery acid, permitting the resulting separator to absorb the electrolyte more quickly.

The cured sheet is then trimmed to exact width using a suitable cutter and this trimmed sheet is cut to the exact length suitable for use in a storage battery construction to yield the finished product.

Production of our separators can be either batchwise or continuous, the latter being preferred.

EXAMPLE

A cotton linters sheet which exhibited uniform "formation" and had an average apparent density of 6.3 grams/cu. in. and a web gauge of 0.030" was utilized in this example. The impregnating solution was prepared according to the following formulation by mixing the ingredients at room temperature with stirring in the order shown.

Formulation of impregnating solution

|  | Dry | Wet |
|---|---|---|
| Water dispersible A-stage phenolformaldehyde resin (70% solids, Durez 16056) | 1,100 | 1,575 |
| Isopropanol |  | 1,305 |
| Water |  | 150 |
| "Tergitol 08" (sodium salt of 2-ethyl hexyl sulfate) | 13.5 | 30 |
| 23% ammonia |  | 135 |
| "Vinsol" resin emulsion (Hercules Powder Co.) | 378 | 945 |
|  | 1,491.5 | 4,140 |

As will be evident to those skilled in the art, the ammonia gives the proper pH to the impregnating solution and stabilizes it so that resin does not separate prior to use.

The fibrous sheet material was passed through a resin impregnator wherein the sheet was thoroughly saturated with this resin solution. Excess free resin solution was then removed from the sheet by passing it through driven squeeze rollers having controllable squeezing action so that the sheet retains solution in such amount as to give from 25 to 50% by weight of cured resin (based on dry resin plus fiber).

The sheet was then passed through a drying chamber and dried therein to a volatile content of 5–30%; preferably 10–20%. It was then embossed. The embossed sheet was then cured at a temperature of 500–550° F. and while still hot was sprayed with a 1.35% water solution of "Tergitol 08." The sheet was then cut to battery separator size and allowed to stand seven hours under relatively non-evaporative conditions. The resulting separators had outstanding, chemical, electrical, and mechanical properties and easily met the rigid specifications imposed upon a separator which is to compete with wooden separators.

In Figs. 1 and 2 of the drawings, reference numeral 1 designates the separator and 2 denotes the integral upstanding spaced ribs formed therein by embossing the dry sheets before curing the phenolic resin content thereof.

The following table summarizes the performance obtained with a phenol-formaldehyde resin at various resin levels both alone and with varying amounts of "Vinsol" resin in accordance with our invention. The phenolic resin used is available commercially as Durez 16056 from Durez Plastics & Chemicals, Inc. It is a straight phenol-formaldehyde resin solution containing 70% non-volatiles and about 26% water.

Resin mixtures vs. oxidation loss and electrical resistance

| Resin Composition | | Resin Pickup, Percent | Oxidation Loss, Percent | Electrical Resistance, Ohms/Sq. In. |
|---|---|---|---|---|
| Phenolic, Percent | "Vinsol," Percent | | | |
| 100 | 0 | 39 | 31 | .056 |
| 100 | 0 | 36 | 32 | .051 |
| 100 | 0 | 32 | 34 | .043 |
| 80 | 20 | 37 | 18 | .051 |
| 80 | 20 | 34 | 16 | .044 |
| 80 | 20 | 30 | 24 | .040 |
| 75 | 25 | 39 | 15 | .056 |
| 75 | 25 | 36 | 20 | .050 |
| 75 | 25 | 34 | 20 | .044 |
| 67 | 33 | 39 | 20 | .054 |
| 67 | 33 | 35 | 27 | .049 |
| 67 | 33 | 33 | 26 | .046 |
| 50 | 50 | 38 | 37 | .056 |
| 50 | 50 | 36 | 36 | .050 |
| 50 | 50 | 34 | 34 | .048 |

In the table the percentage figures applied to the phenolic resins and to the "Vinsol" emulsion denote actual percentages of phenolic resins or of phenolic resin and "Vinsol" resin based upon total dry weight of resins used. Thus, for example, the designations "67%" and "33%" signify that the impregnating solution comprised the phenolic resin and the "Vinsol" in the weight ratio on a dry basis of 67:33. The trends shown by these data are illustrated graphically by Figures 3, 4, and 5.

From the foregoing many advantages of our invention will be obvious to those skilled in the art. The principal advantage is that the invention enables a substantial reduction in the cost of the finished separator without impairing the electrical and chemical properties thereof as compared to a similar separator made without the "Vinsol" resin used in accordance with our invention. Actually the present invention makes it possible to produce a separator which is superior to that obtained without the "Vinsol." By means of the present invention resistance to chemical attack is improved considerably without impairing the electrical resistance properties for a given amount of contained resin in the separator sheet. Another advantage is that slightly inferior and less expensive pulp sheets may be economically up-graded for satisfactory service as a battery separator by employing the "Vinsol" resin-phenolic resin binder of our invention. Many other advantages of the present invention will be apparent to those skilled in the art.

Having thus described our invention, what we claim and desire to protect by Letters Patent is:

1. A liquid permeable battery separator made from a bibulous cellulosic fibrous sheet having an apparent density of 3 to 8 grams/cu. in. the fibers of which are bonded and protected against battery acid by an intimate mixture of a C-stage phenol-formaldehyde resin and a substantially gasoline-insoluble pine wood resin, said resin mixture being formed by curing a mixture of an A-stage phenol-formaldehyde resin and said pine wood resin deposited in and around the fibers of said sheet by drying from an aqueous solution of said A-stage resin and dispersion of said pine wood resin, said resin mixture protecting the fibers against attack by battery acid but not substantially reducing the permeability of said sheet and being present in amount equal to from 25 to 50 percent by weight based on fibers plus dry resins.

2. A separator as set forth in claim 1 wherein the proportion of said pine wood resin ranges from 5 to 50 percent by weight based on the sum of said phenol-formaldehyde resin and said pine wood resin.

3. A separator as set forth in claim 1 wherein the proportion of said pine wood resin ranges from 20 to 35 percent by weight based on the sum of said phenol-formaldehyde resin and said pine wood resins.

4. A method of making a liquid permeable battery separator which comprises thoroughly impregnating a bibulous cellulosic fibrous sheet having an apparent density of 3 to 8 grams/cu. in with a mixture of a solution of an A-stage phenol-formaldehyde resin and an aqueous dispersion of a substantially gasoline-insoluble pine wood resin, drying the impregnated sheet and thereby depositing in and around the fibers of the sheet a mixture of said resins, said resins being so distributed that upon conversion of said A-stage resin to the C-stage the resulting resin mixture will protect said fibers against attack by battery acid but will not lessen materially the air permeability of the sheet, heating the dried sheet to advance said A-stage resin to the C-stage, and cutting the resulting sheet into battery separators.

5. A method as set forth in claim 4 wherein the proportion of said pine wood resin ranges from 5 to 50 percent by weight based on the sum of said phenol-formaldehyde resin and said pine wood resin.

6. A method as set forth in claim 4 wherein the proportion of said pine wood resin ranges from 20 to 35 percent by weight based on the sum of said phenol-formaldehyde resin and said pine wood resin.

7. A method as set forth in claim 4 wherein said drying step is so conducted as to leave from 5 to 30 percent volatiles in the sheet and the sheet containing said volatile content is embossed to form spaced integral protuberant portions on one side and corresponding depressed portions on the other side, after which the embossed sheet is subjected to said heating step.

No references cited.